United States Patent
Lainema

(10) Patent No.: US 6,711,211 B1
(45) Date of Patent: Mar. 23, 2004

(54) METHOD FOR ENCODING AND DECODING VIDEO INFORMATION, A MOTION COMPENSATED VIDEO ENCODER AND A CORRESPONDING DECODER

(75) Inventor: Jani Lainema, Irving, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/566,020

(22) Filed: May 8, 2000

(51) Int. Cl.$^7$ .................................................. H04N 7/12
(52) U.S. Cl. ................................................. 375/240.24
(58) Field of Search ...................... 375/240.12, 240.24, 375/240.25, 240.26, 240.27; 382/238, 239; 348/394.1, 401.1, 417.1, 418.1; H04N 7/12, 11/02, 11/04

(56) References Cited

U.S. PATENT DOCUMENTS

| | | | |
|---|---|---|---|
| 5,412,435 A | * 5/1995 | Nakajima | 348/699 |
| 5,453,799 A | * 9/1995 | Yang et al. | 348/699 |
| 5,563,895 A | * 10/1996 | Malkamaki et al. | 714/748 |
| 6,031,826 A | * 2/2000 | Hassan | 370/321 |
| 6,526,096 B2 | * 2/2003 | Lainema et al. | 375/240.16 |

OTHER PUBLICATIONS

Zhang, Kui et al, Image sequence Coding Using Multiple–Level Segmentation and Affine Estimation, Dec. 1997, IEEE, vol. 15 No. 9, pp. 17041713.*

"Representation Of Motion Information For Image Coding", Nguyen et al., Proceedings Of The Picture Coding Symposium, pp. 8.4–1–8.4–5, 1990.

"Segmentation Algorithm By Multicriteria Region Merging", B. Marcotegui, Centre De Morphologie Mathematique, Document Sim (95)19, 1995.

* cited by examiner

*Primary Examiner*—Nhon Diep
(74) *Attorney, Agent, or Firm*—Perman & Green, LLP

(57) ABSTRACT

A method for encoding video information is presented, where a piece of current video information is segmented into macroblocks and a certain number of available macroblock segmentations for segmenting a macroblock into blocks is defined. Furthermore, for each available macroblock segmentation at least one available prediction method is defied, each of which prediction methods produces prediction motion coefficients for blocks within said macroblock, resulting in a certain finite number of available macroblock-segmentation—prediction-method pairs. For a macroblock, one of the available macroblock-segmentation—prediction-method pairs is selected, and thereafter the macroblock is segmented into blocks and prediction motion coefficients for the blocks within said macroblock are produced using the selected macroblock-segmentation—prediction-method pair. A corresponding decoding method, an encoder and a decoder are also presented.

57 Claims, 8 Drawing Sheets

METHOD FOR ENCODING AND DECODING VIDEO INFORMATION, A MOTION COMPENSATED VIDEO ENCODER AND A CORRESPONDING DECODER

The present invention relates to video coding. In particular, it relates to compression of video information using motion compensated prediction.

BACKGROUND OF THE INVENTION

A video sequence typically consists of a large number video frames, which are formed of a large number of pixels each of which is represented by a set of digital bits. Because of the large number of pixels in a video frame and the large number of video frames even in a typical video sequence, the amount of data required to represent the video sequence quickly becomes large. For instance, a video frame may include an array of 640 by 480 pixels, each pixel having an RGB (red, green, blue) color representation of eight bits per color component, totaling 7,372,800 bits per frame. Another example is a QCIF (quarter common intermediate format) video frame including 176×144 pixels. QCIF provides an acceptably sharp image on small (a few square centimeters) LCD displays, which are typically available in mobile communication devices. Again, if the color of each pixel is represented using eight bits per color component, the total number of bits per frame is 608,256.

Alternatively, a video frame can be presented using a related luminance/chrominance model, mown as the YUV color model. The human visual system is more sensitive to intensity (luminance) variations that it is to color (chrominance) variations. The YUV color model exploits this property by representing an image in terms of a luminance component Y and two chrominance components U, V, and by using a lower resolution for the chrominance components than for the luminance component In his way the amount of information needed to code the color information in an image can be reduced with an acceptable reduction in image quality. The lower resolution of the chrominance components is usually attained by spatial sub-sampling. Typically a block of 16×16 pixels in the image is coded by one block of 16×16 pixels representing the luminance information and by one block of 8×8 pixels for each chrominance component. The chrominance components are thus sub-samples by a factor of 2 in the x and y directions. Tie resulting assembly of one 16×16 pixel luminance block and two 8×8 pixel chrominance blocks is here referred to as a YUV macroblock. A QCIF image comprises 11×9 YUV macroblocks. The luminance blocks and chrominance blocks are represented with 8 bit resolution, and the total number of bits required per YUV macroblock is (16×16× 8)+2X(8×8×8)=3072 bits. The number of bits needed to represent a video frame is thus 99×3072=304,128 bits.

In a video sequences comprising a sequence of frames in YUV coded QCIF format recorded/displayed at a rate of 15–30 frames per second, the amount of data needed to transmit information about each pixel in each frame separately would thus be more tan 4 Mbps (million bits per second). In conventional videotelephony, where the encoded video information is transmitted using fixed-line telephone networks, the transmission bit rates are typically multiples of 64 kilobits/s. In mobile videotelephony, where transmission takes place at least in part over a radio communications link, the available transmission bit rates can be as low as 20 kilobits/s. Therefore it is clearly evident that methods are required whereby the amount of information used to represent a video sequence can be reduced, Video coding tackles the problem of reducing the amount of information that needs to be transmitted in order to present the video sequence with an acceptable image quality.

In typical video sequences the change of the content of successive frames is to a great extent the result of the motion in the scene. This motion may be due to camera motion or due to motion of the objects present in the scene. Therefore, typical video sequences are characterized by significant temporal correlation, which is highest along the trajectory of the motion. Efficient compression of video sequences usually takes advantage of this property of video sequences. Motion compensated prediction is a widely recognized technique for compression of video. It utilizes the fact that in a typical video sequence, image intensity/chrominance values in a particular frame segment can be predicted using image intensity/chrominance values of a segment in some other already coded and transmitted frame, given the motion trajectory between these two frames. Occasionally, it is advisable to transmit a frame that is coded without reference to any other frames, to prevent deterioration of image quality due to accumulation of errors and to provide additional functionality such as random access to the video sequence. Such a frame is called an INTRA frame.

A schematic diagram of an example video coding system using motion compensated prediction is shown in FIGS. 1 and 2 of the accompanying drawings. FIG. 1 illustrates an encoder 10 employing motion compensation and FIG. 2 illustrates a corresponding decoder 20. The operating principle of video coders using motion compensation is to minimize the prediction error frame $E_n(x,y)$, which is the difference between the current frame $I_n(x,y)$ being coded and a prediction frame $P_n(x,y)$. The prediction error frame is thus $$E_n(x,y)=I_n(x,y)-P_n(x,y). \qquad (1)$$

The prediction frame $P_n(x,y)$ is built using pixel values of a reference frame $R_n(x,y)$, which is one of the previously coded and transmitted frames (for example, a frame preceding the current frame), and the motion of pixels between the current frame and the reference frame. More precisely, the prediction frame is constructed by finding the prediction pixels in the reference frame $R_n(x,y)$ and moving the prediction pixels as the motion information specifies. The motion of the pixels may be presented as the values of horizontal and vertical displacements $\Delta x(x,y)$ and $\Delta y(x,y)$ of a pixel at location (x,y) in the current frame $I_n(x,y)$, The pair of numbers $[\Delta x(x,y), \Delta y(x,y)]$ is called the motion vector of this pixel.

The motion vectors $[\Delta x(x,y), \Delta y(x,y)]$ are calculated in the Motion Field Estimation block 11 in the encoder 10. The set of motion vectors of all pixels of the current frame $[\Delta x(\cdot), \Delta y(\cdot)]$ is called the motion vector field. Due to the very large number of pixels in a frame it is not efficient to transmit a separate motion vector for each pixel to the decoder. Instead, in most video coding schemes the current frame is divided into larger image segments $S_k$ and information about the segments is transmitted to the decoder.

The motion vector field is coded in the Motion Field Coding block 12 of the encoder 10. Motion Field Coding refers to the process of representing the motion in a frame using some predetermined functions or, in other words, representing it with a model. Almost all of the motion vector field models commonly used are additive motion models. Motion compensated video coding schemes may define the motion vectors of image segments by the following general formula:

$$\Delta x(x, y) = \sum_{i=0}^{N-1} a_i f_i(x, y) \qquad (2)$$

$$\Delta y(x, y) = \sum_{i=0}^{N-1} b_i g_i(x, y) \qquad (3)$$

where coefficients $a_i$ and $b_i$ are called motion coefficients. They are transmitted to the decoder (information stream 2 in FIGS. 1 and 2). Functions $f_i$ and $g_i$ are called motion field basis fictions, and they are known both to the encoder and decoder. An approximate motion vector field ($\Delta x(x,y)$, $\Delta y(x,y)$) can be constructed using the coefficients and the basis functions.

The prediction frame $P_n(x,y)$ is constructed in the Motion Compensated Prediction block 13 in the encoder 10, and it is given by $$P_n(x,y) = R_n[x+\tilde{\Delta}x(x,y), y+\tilde{\Delta}y(x,y)], \qquad (4)$$

where the reference frame $R_n(x,y)$ is available in the Frame Memory 17 of the encoder 10 at a given instant In the Prediction Error Coding block 14, the prediction error frame $E_n(x,y)$ is typically compressed by representing it as a finite series (transform) of some 2-dimensional functions. For example, a 2-dimensional Discrete Cosine Transform (DCT) can be used. The transform coefficients related to each function are quantized and entropy coded before they are transmitted to the decoder (information stream 1 in FIGS. 1 and 2), Because of the error introduced by quantization, this operation usually produces some degradation in the prediction error frame $E_n(x,y)$. To cancel this degradation, a motion compensated encoder comprises a Prediction Error Decoding block 15, where the a decoded prediction error frame $\tilde{E}_n(x,y)$ is constructed using the transform coefficients. This decoded prediction error frame is added to the prediction frame $P_n(x,y)$ and the resulting decoded current frame $\tilde{I}_n(x,y)$ is stored to the Frame Memory 17 for further use as the next reference frame $R_{n+1}(x,y)$.

The information stream 2 carrying information about the motion vectors is combined with information about the prediction error in the multiplexer 16 and an information stream (3) containing typically at least those two types of information is sent to the decoder 20.

In the Frame Memory 24 of the decoder 20 there is a previously reconstructed reference frame $R_n(x,y)$. The prediction frame $P_n(x,y)$ is constructed in the Motion Compensated Prediction block 21 in the decoder 20 similarly as in the Motion Compensated Prediction block 13 in the encoder 10. The transmitted transform coefficients of the prediction error frame $E_n(x,y)$ are used in the Prediction Error Decoding block 22 to construct the decoded prediction error frame $\tilde{E}_n(x,y)$. The pixels of the decoded current frame $\tilde{I}_n(x,y)$ are reconstructed by adding the prediction frame $P_n(x,y)$ and the decoded prediction error frame $\tilde{E}_n(x,y)$ $$\tilde{I}_n(x,y) = P_n(x,y) + \tilde{E}_n(x,y) = R_n[x+\tilde{\Delta}x(x,y), y+\tilde{\Delta}y(x,y)] + \tilde{E}_n(x,y). \qquad (5)$$

This decoded current frame may be stored in the Frame Memory 24 as the next reference frame $R_{n+1}(x,y)$.

Let us next discuss in more detail the motion compensation and transmission of motion information. In order to minimize the amount of information needed in sending the motion coefficients to the decoder, coefficients can be predicted from the coefficients of the neighboring segments When this kind of motion field prediction is used, the motion field is expressed as a sum of a prediction motion field and a refinement motion field. The prediction motion field is constructed using the motion vectors associated with neighboring segments of the current frame. The prediction is performed using the same set of rules and possibly some auxiliary information in both encoder and decoder. The refinement motion field is coded, and the motion coefficients related to this refinement motion field are transmitted to the decoder. This approach typically results in savings in transmission bit rate. The dashed lines in FIG. 1 illustrate some examples of the possible information some motion estimation and coding schemes may require in the Motion Field Estimation block 11 and in the Motion Field Coding block 12.

Polynomial motion models are a widely used family of models. (See, for example H. Nguyen and E. Dubois, "Representation of motion information for image coding," in *Proc, Picture Coding Symposium* '90, Cambridge, Mass., Mar. 26–18, 1990, pp. 841–845 and Centre de Morphologie Mathematique (CMM), "Segmentation algorithm by multicriteria region merging," Document SIM(95)19, COST 211ter Project Meeting, May 1995).

The values of motion vectors are described by functions which are linear combinations of two dimensional polynomial functions. The translational motion model is the simplest model and requires only two coefficients to describe the motion vectors of each segment. The values of motion vectors are given by the formulae:

$$\Delta x(x,y) = a_0$$

$$\Delta y(x,y) = b_0 \qquad (6)$$

This model is widely used in various international standards (ISO MPEG-1, MPEG-2, MPEG4, ITU-T Recommendations H.261 and H.263) to describe motion of 16×16 and 8×8 pixel blocks. Systems utilizing a translational motion model typically perform motion estimation at full pixel resolution or some integer fraction of full pixel resolution, for example with an accuracy of ½ or ⅓ pixel resolution.

Two other widely used models are the affine motion model given by the equation:

$$\Delta x(x,y) = a_0 + a_1 x + a_2 y$$

$$\Delta y(x,y) = b_0 + b_1 x + b_2 y \qquad (7)$$

and the quadratic motion model given by the equation:

$$\Delta x(x,y) = a_0 + a_1 x + a_2 y + a_3 xy + a_4 x^2 + a_5 y^2$$

$$\Delta y(x,y) = b_0 + b_1 x + b_2 y + b_3 xy + b_4 x^2 + b_5 y^2 \qquad (8)$$

The affine motion model presents a very convenient trade-off between the number of motion coefficients and prediction performance. It is capable of representing some of the common real-life motion types such as translation, rotation, zoom and shear with only a few coefficients. The quadratic motion model provides good prediction performance, but it is less popular in coding than the affine model, since it uses more motion coefficients, while the prediction performance is not substantially better than, for example, that of the affine motion model. Furthermore, it is computationally more costly to estimate the quadratic motion than to estimate the affine motion.

The Motion Field Estimation block 11 calculates initial motion coefficients $a_0^i, \ldots, a_n^i, b_0^i, \ldots, b_n^i$ for [$\Delta x(x,y)$, Δy(x,y)] a given segment $S_k$, which initial motion coefficients minimize some measure of prediction error in the segment. In the simplest case, the motion field estimation uses the current frame $I_n(x,y)$ and the reference frame $R_n(x,y)$ as input values. Typically the Motion Field Estimation block outputs the [Δx(x,y),Δy(x,y)] initial motion coefficients to the Motion Field Coding block 12.

The segmentation of the current frame into segments $S_k$ can, for example, be carried out in such a way that each segment corresponds to a certain object moving in the video sequence, but this kind of segmentation is a very complex procedure. A typical and computationally less complex way to segment a video frame is to divide it into macroblocks and to further divide the macroblocks into rectangular blocks. In this description term macroblock refers generally to a part of a video frame. An example of a macroblock is the previously described YUV macroblock. FIG. 3 presents an example, where a video frame 30 is to divided into macroblocks 31 having a certain number of pixels. Depending on the encoding method, there may be many possible macroblock segmentations. FIG. 3 presents a case, where there are four possible ways to segment a macroblock: macroblock 31A is segmented into blocks 32, macroblock 31B is segmented with a horizontal dividing line into blocks 33, and macroblock 31C is segmented with a vertical dividing line into blocks 34. The fourth possible segmentation is to treat a macroblock as a single block. The macroblock segmentations presented in FIG. 3 are given as examples; they are by no means an exhaustive listing of possible or feasible macroblock segmentations.

The Motion Field Coding block 12 makes the final decisions on what kind of motion vector field is transmitted to the decoder and how the motion vector field is coded. It can modify the segmentation of the current frame, the motion model and motion coefficients in order to minimize the amount of information needed to describe a satisfactory motion vector field. The decision on segmentation is typically carried out by estimating a cost of each alternative macroblock segmentation and by choosing the one yielding the smallest cost. As a measure of cost, the most commonly used is a Lagrangian cost function $$L(S_k)=D(S_k)+\lambda R(S_k),$$

which links a measure of the reconstruction error $D(S_k)$ with a measure of bits needed for transmission $R(S_k)$ using a Lagrangian multiple $\lambda$. The Lagrangian cost represents a trade-off between the quality of transmitted video information and the bandwidth needed in transmission. In general a better image quality, i.e. small $D(S_k)$, requires a larger amount of transmitted information, i.e. large $R(S_k)$.

In present systems, which utilize a translational motion model, prediction motion coefficients are typically formed by calculating the median of surrounding, already transmitted motion coefficients. This method achieves fairly good performance in terms of efficient use of transmission bandwidth and image quality. The main advantage of this method is that the prediction of motion coefficients is straightforward.

The more accurately the prediction motion coefficients correspond to the motion coefficients of the segment being predicted, the fewer bits are needed to transmit information about the refinement motion field. It is possible to select, for example among the neighboring blocks, the block whose motion coefficient are closest the motion coefficients of the block being predicted. The segment selected for the prediction is signaled to the decoder. The main drawback of this method is that finding the best prediction candidate among the already transmitted image segments is a complex task the encoder has to perform exhaustive calculations to evaluate all the possible prediction candidates and then select the best prediction block, This procedure has to be carried out separately for each block.

There are systems where the transmission capacity for the compressed video stream is very limited and where the encoding of video information should not be too complicated, For example, wireless mobile terminals have limited space for additional components and as they operate by battery, they typically cannot provide computing capacity comparable to that of desktop computers. In radio access networks of cellular systems, the available transmission capacity for a video stream can be as low as 20 kbps. Consequently, there is need for a video encoding method, which is computationally simple, provides good image quality and achieves good performance in terms of required transmission bandwidth. Furthermore, to keep the encoding method computationally simple, the encoding method should provide satisfactory results using simple motion models.

SUMMARY OF THE INVENTION

An object of the present invention is to provide a method that provides a flexible and versatile motion coefficient prediction for encoding/decoding video information using motion compensation. A further object of the invention is to provide a motion compensated method for coding/decoding video information that provides good performance in terms of transmission bandwidth and image quality while being computationally fairly simple. A further object is to present a method for encoding/decoding video information that provides satisfactory results when a comparatively simple motion model, such as the translational motion model, is used.

These and other objects of the invention are achieved by associating the motion coefficient prediction method used for a certain macroblock with the segmentation of the macroblock.

A method for encoding video information according to the invention comprises the steps of:

segmenting a piece of current video information into macroblocks, defining a certain number of available macroblock segmentations for segmenting a macroblock into blocks, defining for each available macroblock segmentation at least one available prediction method, each of which prediction methods produces prediction motion coefficients for blocks within said macroblock resulting in a certain finite number of available macroblock-segmentation—prediction-method pairs, selecting for a macroblock one of the available macroblock-segmentation—prediction-method pairs, and segmenting the macroblock into blocks and producing prediction motion coefficients for the blocks within said macroblock using the selected macroblock-segmentation—prediction-method pair.

In a method according to the invention, a piece of current video information, typically a current frame, is segmented into macroblocks. These macroblocks can have any predetermined shape, but typically they are quadrilateral. Furthermore, a certain number of possible segmentations of the macroblocks into blocks is defined, and these are called the available macroblock segmentations. The segmentation of a macroblock into blocks is in this description called macroblock segmentation. The blocks are also typically quadrilateral. The motion of a block within a piece of current video information is typically estimated using a piece of reference video information (typically a reference frame), and the motion of the block is usually modeled using a set of basis fictions and motion coefficients. The motion model used in a method according to the invention is advantageously a translational motion model, but there are no restrictions on the use of any other motion model. In a method according to the invention, at least some motion coefficients are represented as sums of prediction motion coefficients and difference motion coefficients and a certain prediction method is used to determine the prediction motion coefficients.

Typically a piece of current video information, for example a current frame, is encoded by segmenting a frame into macroblocks and then processing the macroblocks in a certain scanning order, for example one by one from left-to-right and top-to-bottom throughout the frame. In other words, in this example the encoding process is performed in rows, progressing from top to bottom. The way in which the macroblocks are scanned is not restricted by the invention. A macroblock may be segmented, and the motion field of blocks within a macroblock is estimated. Prediction motion coefficients for a certain block are produced using the motion coefficients of some of the blocks in the already processed neighboring macroblocks or the motion coefficients of some of the already processed blocks within the same macroblock. The segmentation of the already processed macroblocks and the motion coefficients of the blocks relating to these macroblocks are already known.

A distinctive feature in encoding and decoding methods according to the invention is that for each macroblock segmentation there is a finite number of prediction methods, Certain predetermined allowable pairs of the macroblock segmentations and prediction methods are thus formed. Here the term prediction method refers to two issues: firstly, it defines which blocks are used in producing the prediction motion coefficients for a certain block within a current macroblock and, secondly, it defines how the motion coefficients related to these prediction blocks are used in producing the prediction motion coefficients for said block. Thus, a macroblock-segmentation—prediction-method pair indicates unambiguously both the segmentation of a macroblock and how the prediction motion coefficients for the blocks within the macroblock are produced. The prediction method may specify, for example, that prediction motion coefficients for a block are derived from an average calculated using motion coefficients of certain specific prediction blocks, or that prediction motion coefficients for a block are derived from the motion coefficient of one particular prediction block. The word average here refers to a characteristic describing a certain set of numbers; it may be, for example, an arithmetic mean, a geometric mean, a weighted mean, a median or a mode. Furthermore, it is possible that the prediction coefficients of a block are obtained by projecting motion coefficients or average motion coefficients from one block to another.

By restricting the number of possible prediction methods per macroblock segmentation, the complexity of the encoding process is reduced compared, for example, to an encoding process where the best prediction motion coefficient candidate is determined freely using any neighboring blocks or combinations thereof. In such a case, there is a large number of prediction motion coefficient candidates. When the prediction blocks are defined beforehand for each prediction method and there is a limited number of prediction methods per macroblock segmentation, it is possible to estimate the cost of each macroblock-segmentation—prediction-method pair. The pair minimizing the cost can then be selected, Advantageously, there is only one available prediction method per macroblock segmentation. This reduces the complexity of the encoding method even further. Furthermore, in this situation it is possible to conclude the prediction method of a block directly from the selected macroblock segmentation. There is thus necessarily no need to transmit information about the prediction method to the decoding entity. Thus, in this case the amount of transmitted information is not increased by adding adaptive features, i.e. various prediction methods used within a frame, to the encoded information.

By selecting the available prediction blocks and defining the macroblock-segmentation-specific prediction methods suitably, it is possible to implement a high performance video encoding method using at most three predetermined prediction blocks to produce prediction motion coefficients and allowing only one prediction method per macroblock segmentation. For each macroblock the macroblock-segmentation—prediction-method pair minimizing a cost function is selected. The simple adaptive encoding of motion information provided by the invention is efficient in terms of computation and in terms of the amount of trotted information and furthermore yields good image quality.

A macroblock, which is processed in a method according to the invention, may be, for example, the luminance component of an YUV macroblock. A method according to the invention may also be applied, for example, to the luminance component and to one or both of the chrominance components of an YUV macroblock.

A method for decoding encoded video information according to the invention comprises the steps of:

specifying information about available macroblock-segmentation—prediction method pairs for producing prediction motion coefficients for blocks within a macroblock, receiving information indicating the macroblock-segmentation—prediction-method pair selected for of a macroblock, and determining the prediction method relating to a macroblock segmentation of said macroblock and producing prediction motion coefficients for blocks within said macroblock using the indicated prediction method.

The invention relates also to an encoder for performing motion compensated encoding of video information, which comprises:

means for receiving a piece of current video information, means for segmenting a piece of current video information into macroblocks, means for specifying available macroblock segmentations, means for specifying at least one available prediction method for each macroblocks segmentation, resulting in a certain finite number of available macroblock-segmentation—prediction method pairs, means for selecting one macroblock-segmentation—prediction method pair among the available macroblock-segmentation—prediction method pairs, means for segmenting a macroblock using the selected macroblock segmentation, and means for producing macroblock-segmentation-specific prediction motion coefficients for blocks within said macroblock using the selected prediction method.

A decoder for performing the decoding of encoded video information according to the invention comprises:

input means for receiving encoded video information, which comprises information indicating a macroblock-segmentation—prediction-method pair relating to a macroblock and about difference motion coefficients of blocks within the macroblock, means for determining the macroblock-segmentation—prediction-method pair of the macroblock based on the received encoded video information, and means for producing prediction motion coefficients for blocks within said macroblock using a prediction method indicated by the macroblock-segmentation—prediction-method pair.

The invention also relates to a storage device and a network element comprising an encoder according to the invention and to a mobile station comprising an encoder or a decoder according to the invention.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
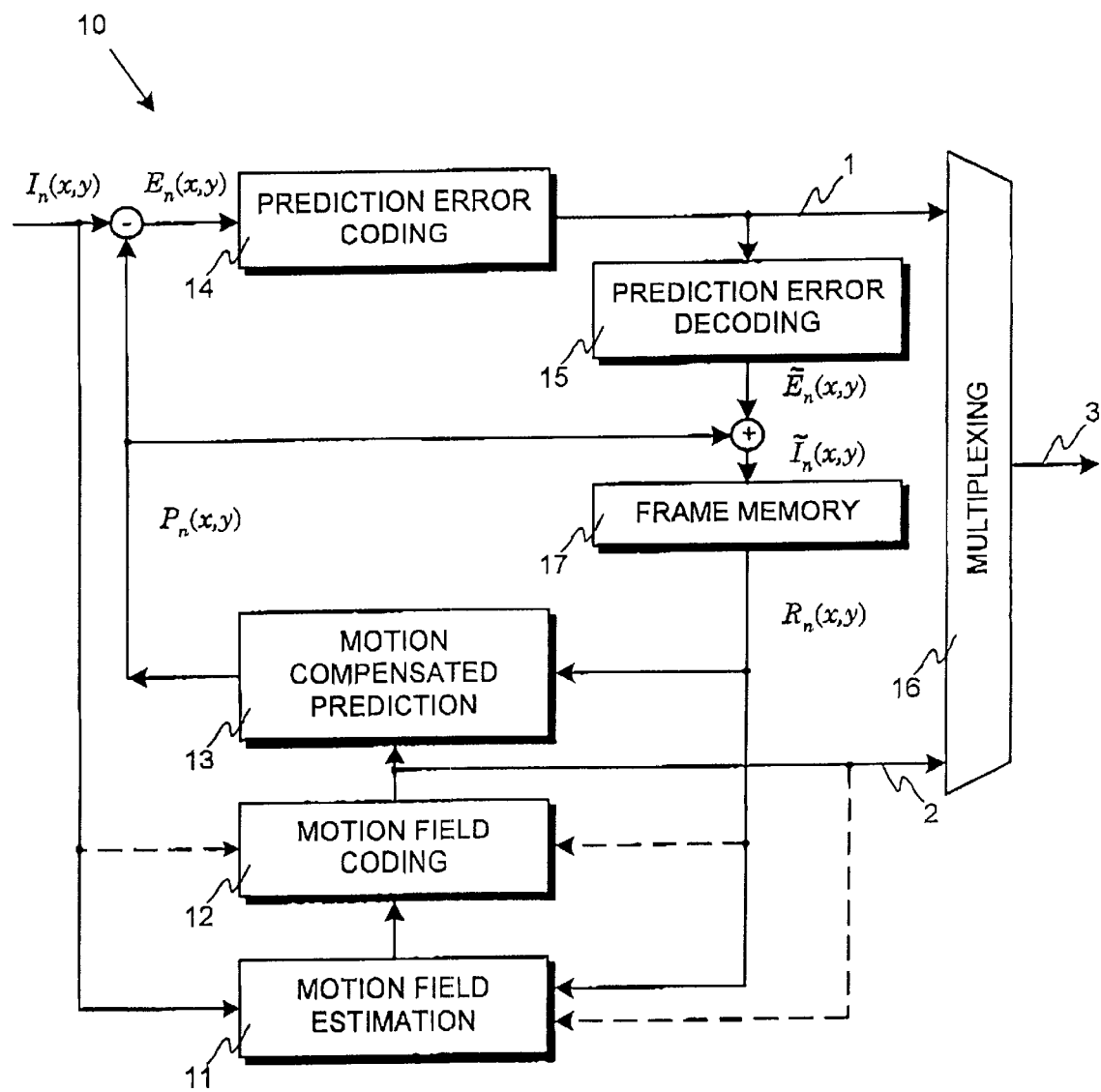
FIG. 1 illustrates an encoder for motion compensated encoding of video according to prior art.
Figure 2:
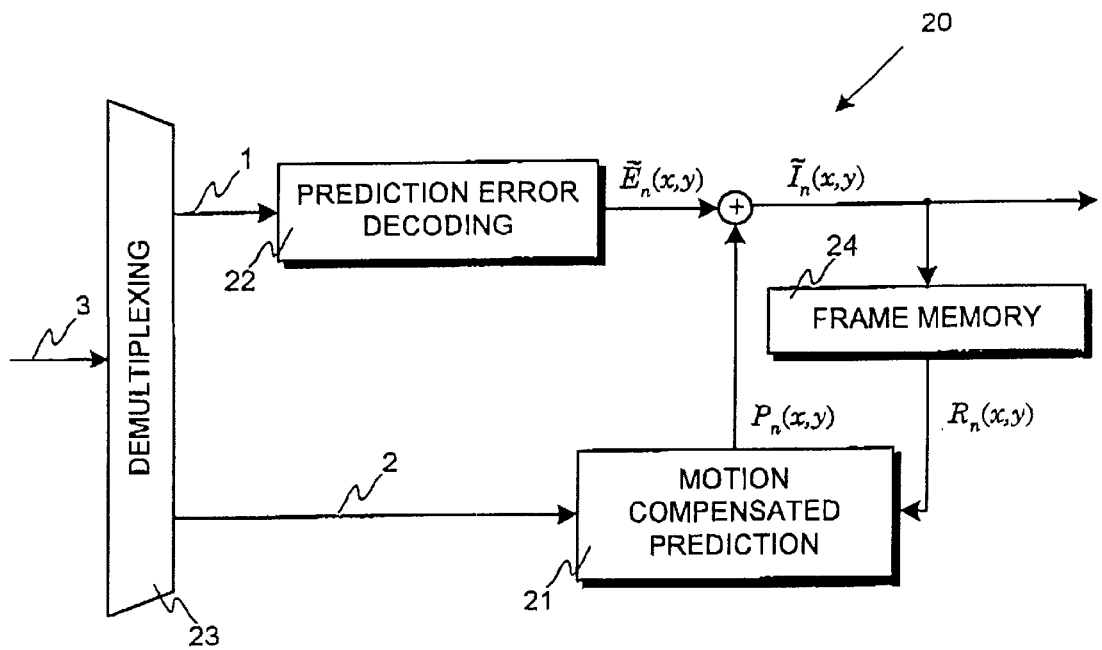
FIG. 2 illustrates a decoder for motion compensated decoding of video according to prior art.
Figure 3:
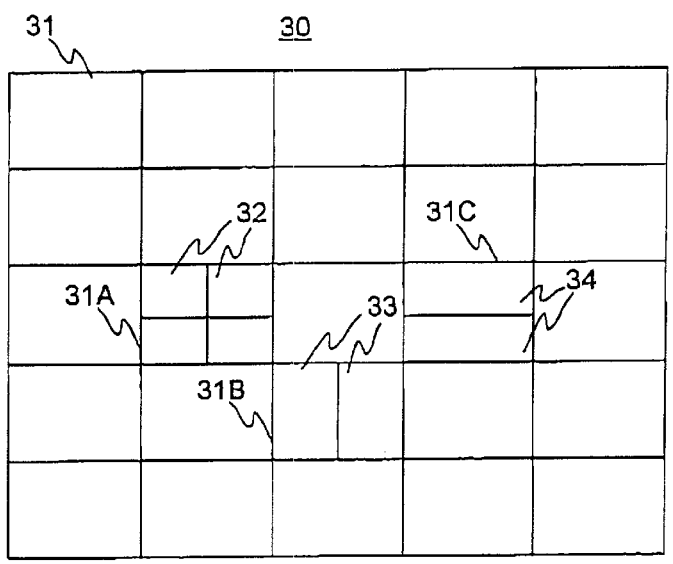
FIG. 3 illustrates a segmentation of a video frame into macroblocks and blocks according to prior art.

FIGS. 1–3 are discussed in detail in the description of motion compensated video encoding and decoding according to prior art.

Figure 4:
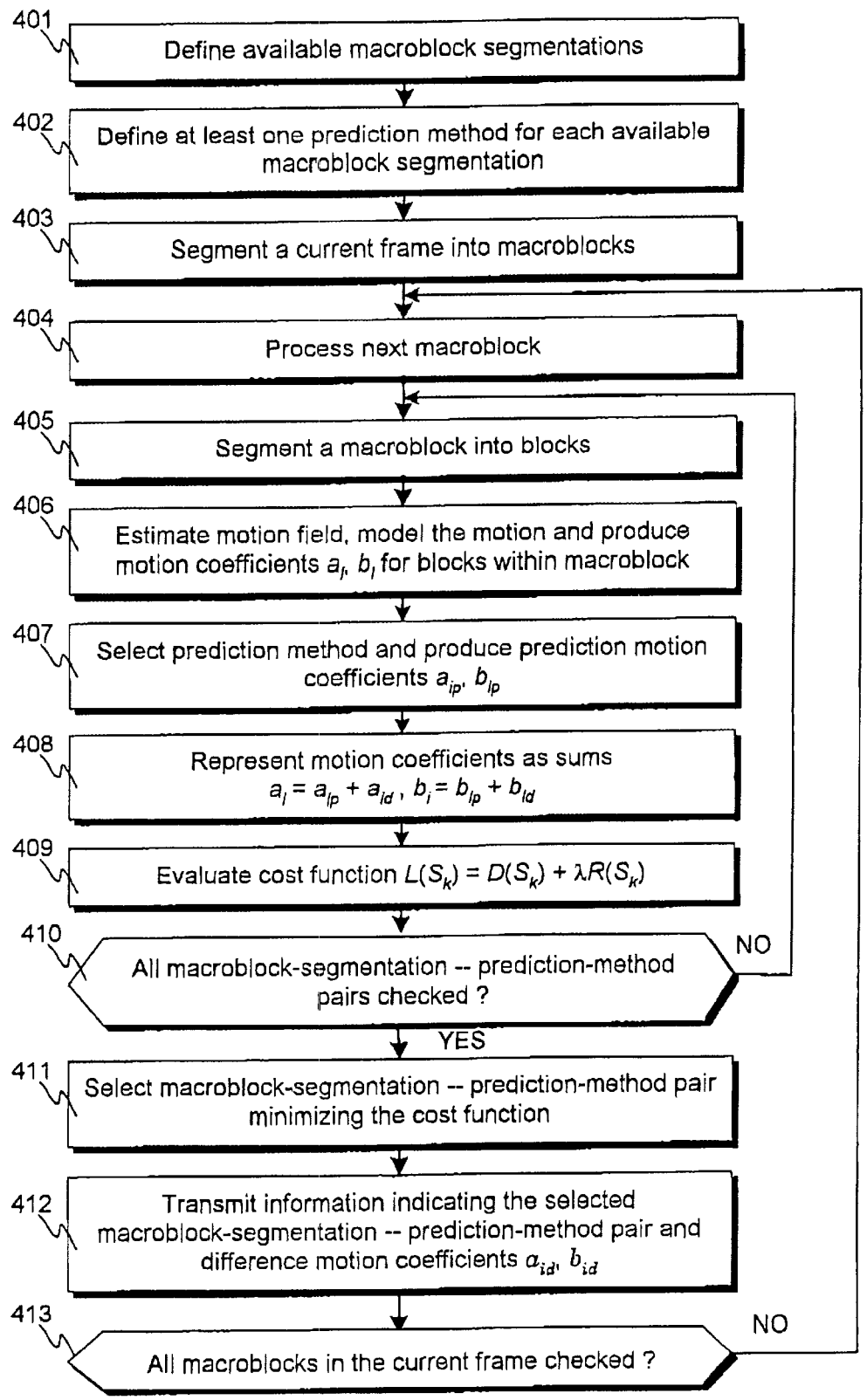
FIG. 4 illustrates a flowchart of a motion compensated video encoding method according to the invention.

FIG. 4 presents a flowchart of a method for encoding video information according to the invention. Only features related to motion encoding are presented in FIG. 4, it does not present, for example, the formation or coding of the prediction error frame, Typically these features are included in encoding methods according to the invention and, of course, may be implemented in any appropriate manner.

In step 401 the available macroblock segmentations are defined. The available macroblock segmentations can comprise, for example, such macroblock segmentations as presented in FIG. 3. In step 402 at least one prediction method for predicting motion coefficients is defined for each available macroblock segmentation, resulting in a certain number of available macroblock-segmentation—prediction-method pairs. Typically, for certain macroblock segmentations an average prediction method is used and for other macroblock segmentations the prediction motion coefficients are derived from the motion coefficients of a single already processed block, which is located either in the current macroblock or in one of the neighboring macroblocks. Advantageous prediction methods related to each macroblock segmentation can be found, for example, by testing various prediction methods beforehand. The motion model used to represent the motion field may affect the selection of the prediction methods. Furthermore, it is possible that a suitable motion model is selected during the encoding. Typically steps 401 and 402 are carried out off-line, before encoding video streams. Usually they are carried out already when, for example, an encoder is designed and implemented.

Steps 403–413 are carried out for each frame of a video stream. In step 403 a current video frame is segmented into macroblocks, and in step 404 encoding of a current macroblock, which is the macroblock currently undergoing motion compensated encoding, starts. In step 405 the current macroblock is segmented into blocks using one of the available macroblock segmentations. At this point there necessarily is no idea of which is the most appropriate macroblock segmentation for the current macroblock, so one way to select the best macroblock segmentation is to investigate them all and then select the most appropriate according to some criterion.

In step 406 the motion vector fields of the blocks within the current macroblock are estimated and the motion fields are coded. This results in motion coefficients $a_i$ and $b_i$ for each of said blocks. In step 407 prediction motion coefficients $a_{ip}$ and $b_{ip}$ for at least one of the blocks within the current macroblock are produced. If there is only one prediction method per macroblock segmentation, this is a straightforward task. Otherwise one of the prediction methods available for the current macroblock segmentation is selected and the prediction motion coefficients are derived according to this prediction method. In step 408 the motion coefficients of the blocks within current macroblock are represented as sums of the prediction motion coefficients and difference motion coefficients $a_{id}$ and $b_{id}$.

A simple way to search for the best macroblock-segmentation—prediction-method pair is presented in steps 409–411. In step 408 the cost $L(S_k)$ related to current macroblock-segmentation—prediction-method pair is calculated. This cost represents the trade-off between the reconstruction error of the decoded image and the number of bits needed to transmit the encoded image, and it links a measure of the reconstruction error $D(S_k)$ with a measure of bits needed for transmission $R(S_k)$ using a Lagrangian multiple λ. Typically the transmission $R(S_k)$ refers to bits required to represent at least the difference motion coefficients and bits required to represent the associated prediction error. It may also involve some signaling information.

Each possible macroblock-segmentation—prediction-method pair is checked, as the loop of steps 405–409 is repeated until prediction motion coefficients and cost function corresponding to all available macroblock-segmentation—prediction-method pairs are evaluated (step 410). In step 411 the macroblock-segmentation—prediction-method pair yielding the smallest cost is selected.

In step 412 information indicating the selected macroblock-segmentation—prediction-method pair for the current macroblock and the difference motion coefficients $a_{id}$ and $b_{id}$ of at least one of the blocks within the current macroblock are transmitted to a receiver or stored into a storage medium. The information indicating the selected macroblock-segmentation—prediction-method pair may, for example, indicate explicitly both the macroblock segmentation and the prediction method. If there is only one possible prediction method per macroblock segmentation, it can be enough to transmit information indicating only the macroblock segmentation of the current block. In step 413 it is checked, if all the macroblocks within the current frame are processed. If they are not, then in step 404 the processing of next macroblock is started.

In a method according to the invention, it is possible that for some macroblocks or for some blocks within a frame the motion coefficients are transmitted as such. It is also possible that for some macroblocks or blocks prediction methods are used, where macroblock-segmentation—prediction-method pairs are not defined.

Figure 5:
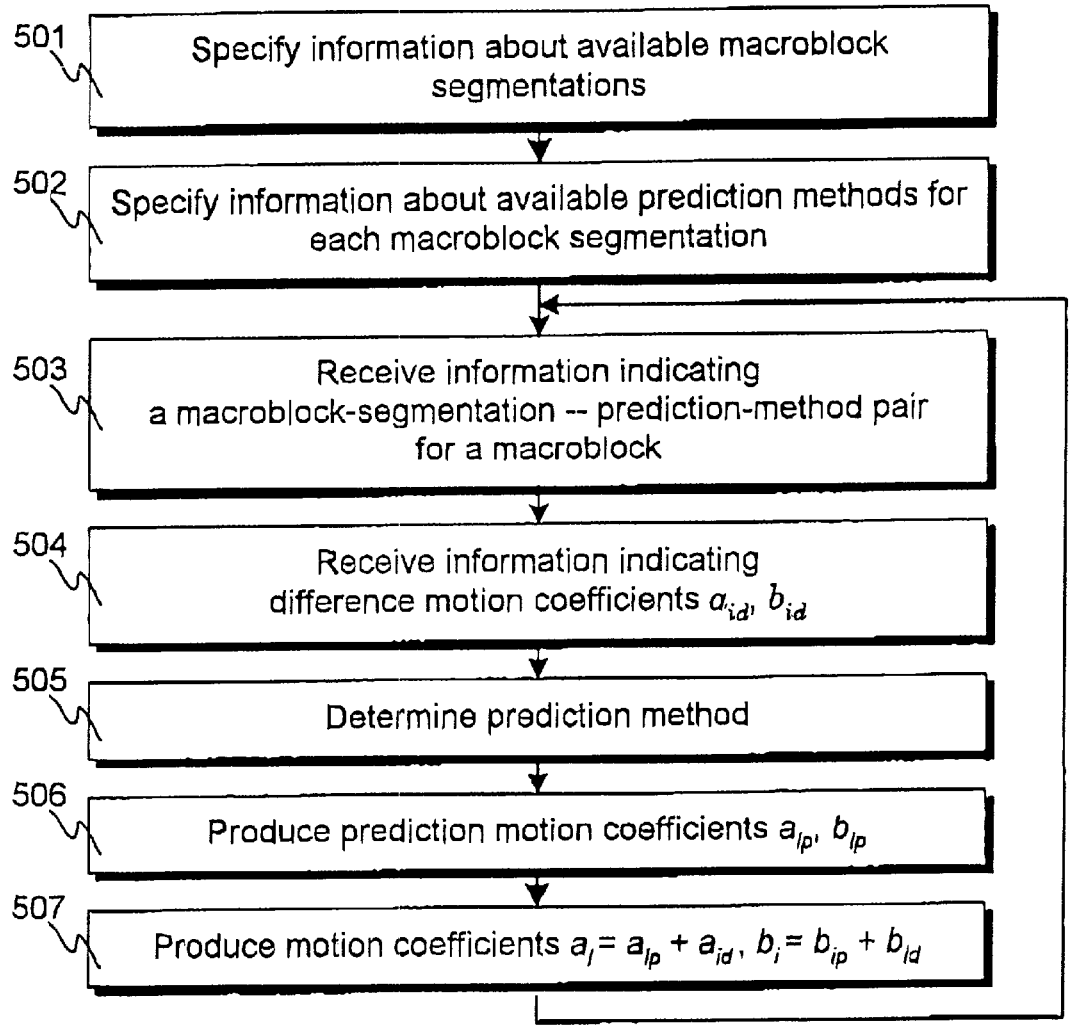
FIG. 5 illustrates a flowchart of a motion compensated video decoding method according to the invention.

FIG. 5 presents a flowchart of a method for decoding an encoded video stream according to the invention. In step 501 information about the available macroblock segmentations is specified, for example by retrieving the information from memory element where it has been previously stored. The decoding method needs to know which kind of macroblock segmentations a received encoded video stream can comprise. In step 502 information about the available macroblock-segmentation—prediction-method pairs is specified. Steps 501 and 502 are typically carried out off-line, before receiving an encoded video stream, They may be carried out, for example, during the design of implementation of a decoder.

Steps 503–507 are carried out during decoding. In step 503 information indicating the segmentation of a current macroblock and prediction method is received. If there is only one available prediction method per macroblock segmentation, information indicating the prediction method is not needed as previously explained. In step 504 information indicating difference motion coefficients $a_{id}$ and $b_{id}$ for at least one of the blocks within the current macroblock are received. In step 505 the decoding entity determines, using the information received in step 503, the prediction method using which the prediction motion coefficient for blocks within the current macroblock are to be produced. The prediction method indicates the prediction blocks related to a certain block and how prediction coefficients for the current block are produced using the motion coefficients of the prediction blocks. There is no need to transmit information about the values of the prediction motion coefficients related to the current block within the current macroblock, because they can be determined in the decoder based on the information received concerning the selected segmentation and prediction method for the current macroblock. In step 506 the prediction motion coefficients $a_{ip}$ and $b_{ip}$ are produced, and in step 507 the motion coefficients $a_i$ and $b_i$ are produced using the difference motion coefficients and the prediction motion coefficients.

Figure 6:
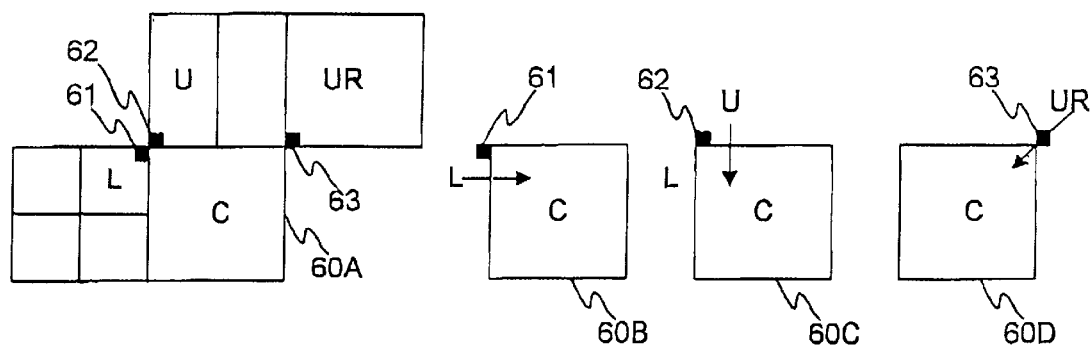
FIG. 6 illustrates various prediction methods that involve different prediction blocks and that can be used to provide prediction motion coefficients for a current block C in a method according to the invention.

FIG. 6 presents schematically four different prediction methods 60A, 60B, 60C and 60D for providing prediction motion coefficients for a current block C. These four prediction methods are given as examples of prediction methods that may be used in a method according to the invention, and the prediction blocks (i.e. those blocks that are used to from prediction motion coefficients for the current block) are defined according to their spatial relationship with the current block C. In these prediction methods, the prediction blocks are dictated by certain pixel locations. These pixel locations are just one way of specifying the prediction blocks for a current block, and they are described here to aid the understanding of how the prediction blocks are selected in certain prediction methods. In the methods which are presented in FIG. 6, the pixel locations are the same for all the methods. Prediction block L is defined as the block which comprises the pixel location 61. Pixel location 61 is the uppermost pixel adjacent to block C from the left-hand side. Similarly, prediction block U is defined as the block comprising pixel location 62, which is the leftmost pixel superjacent to block C. Furthermore, prediction block UR is defined as the block comprising the pixel location 63, which is the pixel corner to corner with the top right corner pixel of block C.

In the first prediction method 60A, three prediction blocks L, U and UR are used. The prediction motion coefficients $a_{ip}$, $b_{ip}$ provided for block C may be derived from an average of the motion coefficients of the L, U and UR prediction blocks. The average may be, for example, the median of the motion coefficient values of block L, U and UR. In the second prediction method 60B, the prediction motion coefficients are derived from the motion coefficients of prediction block L. Similarly, in the third prediction method the prediction motion coefficients are derived from the motion coefficients of prediction block U and in the fourth prediction method they are derived from the motion coefficients of prediction block UR. The concept of presenting only one pixel location relating to a certain block, when only one prediction block is used in producing prediction motion coefficients for said block, and presenting more than one pixel locations relating to a block, when more than one prediction blocks are used in producing prediction motion coefficients for said block, is used also in FIGS. 7 and 8.

The segmentation of the neighboring macroblocks presented in FIG. 6 for prediction method 60A is just an example. When the prediction blocks are defined by pixel locations as presented in FIG. 6, the prediction blocks can be determined unambiguously in spite of the macroblock segmentation of the neighboring macroblocks or of the current macroblock. The three pixel locations in FIG. 6 are an example, the number of pixels can be different and they can be located at other places, Typically the pixel locations specifying the prediction blocks are associated with a current block C and they are at the edge of the current block C.

Figure 7:
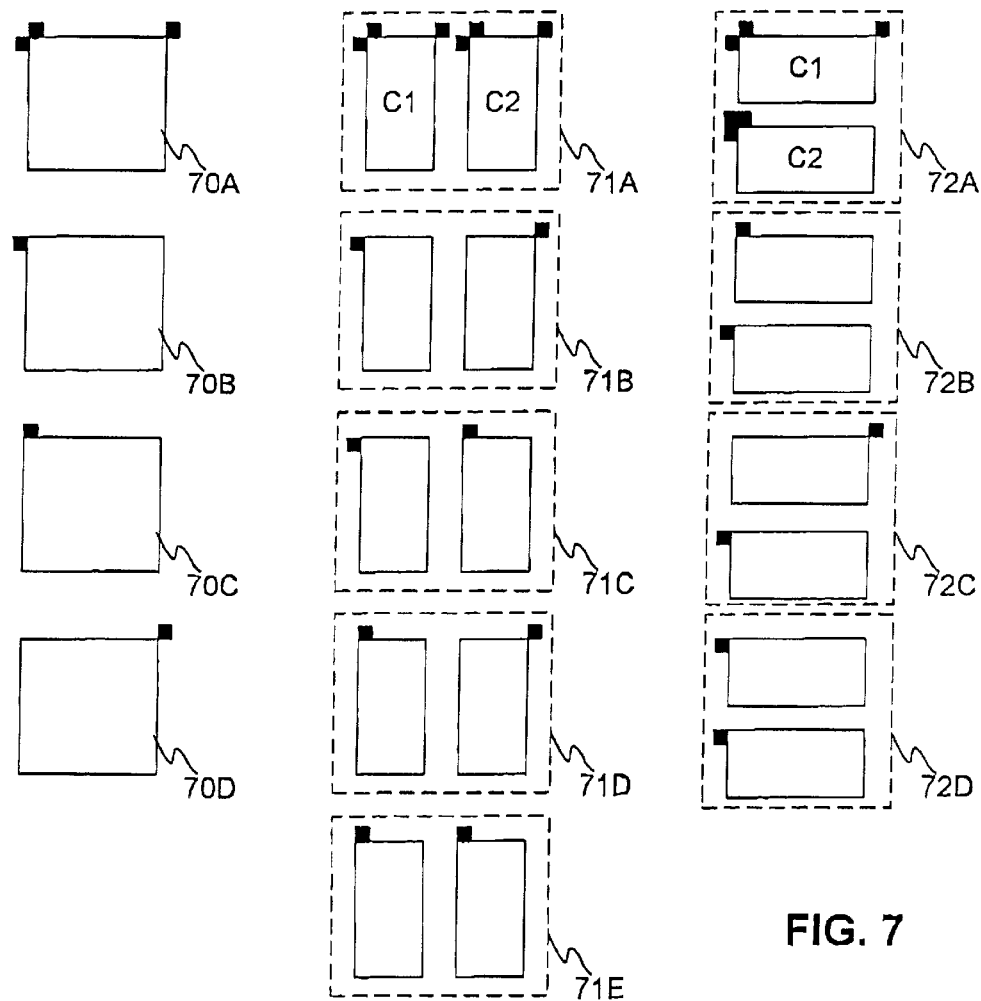
FIG. 7 illustrates a plurality of macroblock-segmentation—prediction-method pairs that can be used in a method according to a first preferred embodiment of the invention.

In a method according to a first preferred embodiment of the invention, there is a certain number of available macroblock segmentations and at least one prediction method relates to each macroblock segmentation. FIG. 7 illustrates schematically three macroblock segmentations 70, 71 and 72, which are an example of the available macroblock segmentations in a first preferred embodiment of the invention. In macroblock segmentation 70, the rectangular macroblock is actually not segmented, but is treated as a single block. In macroblock segmentation 71, the macroblock is divided with one vertical line into two rectangular blocks.

Similarly, in macroblock segmentation 72 the macroblock is divided with one horizontal line into two rectangular blocks. The macroblock size may be 16×16 pixels and translational motion model, for example, may be used.

FIG. 7 furthermore illustrates some examples of prediction method alternatives related to the macroblock segmentations in a method according to the first preferred embodiment. As in FIG. 6, the prediction blocks for blocks within a current macroblock are specified using certain pixel locations which bear a spatial relationship to the blocks within the current macroblock. As an example, the pixel locations in FIG. 7 are the same as in FIG. 6. When the current macroblock is segmented according to example 70, the prediction coefficients for the single block that comprises the current macroblock can be derived using an average of the motion coefficients of the L, U and UR prediction blocks (macroblock segmentation—prediction-method pair 70A), or they can be derived from the motion coefficients of prediction block L (pair 70B), prediction block U (air 70C) or prediction block UR (pair 70D).

FIG. 7 also presents some prediction method alternatives for example macroblock segmentations 71 and 72. As can be seen in FIG. 7, each block within a macroblock preferably has its own associated prediction blocks. The blocks within the current macroblock which are already processed, may themselves act as prediction blocks for other blocks within We same macroblock. As an example, consider the macroblock-segmentation—prediction-method pair 71A, where prediction motion coefficients for each block C1 and C2 within the current macroblock are derived from an average of the motion coefficients of the block-specific prediction blocks. In this prediction method block C1 acts as a prediction block for the block C2. The macroblock-segmentation—prediction-method pairs 71B, 71C, 71D and 71E are further examples of possible prediction methods related to the macroblock segmentation 71. Similarly, various prediction method alternatives are presented for macroblock segmentation 72.

In a method according to the first preferred embodiment of the invention, usually the Lagrangian cost function for each of the macroblock-segmentation—prediction-method pairs 70A, 70B, 70C, 70D, 71A, 71B, 71C, 71D, 71E, 72A, 72B, 72C and 72D is evaluated and then the pair minimizing the cost function is chosen as the actual macroblock segmentation used in encoding the macroblock, as described above in connection with an encoding method according to the invention.

Furthermore, it is possible that the segmentation of the neighboring macroblocks affects the number of the macroblock-segmentation—prediction-method pairs available for the current macroblock. In other words, the segmentation of the neighboring macroblocks may lead to a situation in which that some of the pairs illustrated in FIG. 7 cannot be used for a current macroblock or where some extra macroblock-segmentation—prediction-method pairs are available for the current macroblock. If the macroblock segmentation of neighboring macroblocks limits the selection of the macroblock-segmentation—prediction-method pairs available for a certain macroblock segmentation to, for example, only one macroblock-segmentation—prediction-method pair, it may be unnecessary to transmit information indicating the selected prediction method in addition to the information indicating the segmentation of the current macroblock. The decoding entity can conclude the prediction method from the segmentation of the previously received macroblocks when, for example, a method according to the first preferred embodiment of the invention is used.

Figure 8:
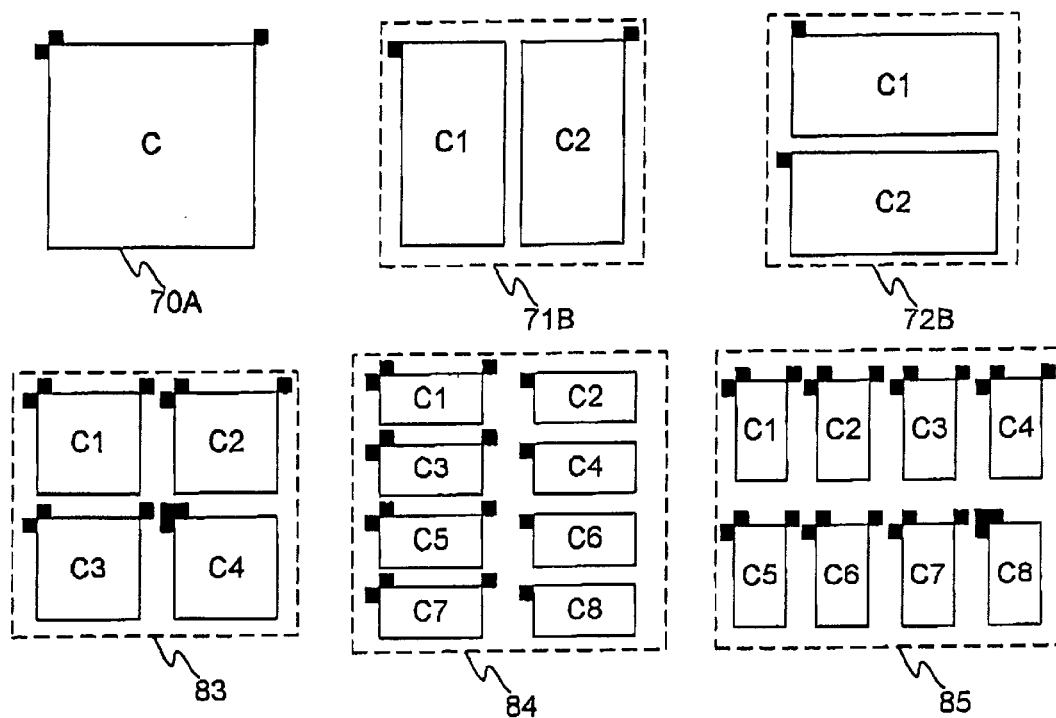
FIG. 8 illustrates a plurality of macroblock-segmentation—prediction-method pairs that can be used in a method according to a second preferred embodiment of the invention.

In a method according to a second preferred embodiment of the invention, there is only one available prediction method per macroblock segmentation. In this case, the information indicating a selected macroblock segmentation can be used to indicate implicitly the selected prediction method (of, step 412 in FIG. 4). Typically in this case the cost function is evaluated in the encoding process for each available macroblock-segmentation—prediction-method pair, and the pair minimizing the cost function is selected for use in encoding the current macroblock. FIG. 8 illustrates an example of a plurality of macroblock-segmentation—prediction-method pairs that can be used in a method according to the second preferred embodiment.

FIG. 8 illustrates six possible macroblock segmentations: single block (macroblock segmentation 70), macroblock is divided once with a vertical dividing line (71) or with a horizontal dividing line (72), macroblock is divided once with a vertical dividing line and once with a horizontal dividing line (83), macroblock is divided once with a vertical dividing line and thrice with a horizontal dividing line (84) and thrice with a vertical dividing line and once with a horizontal dividing line (85). As in FIGS. 6 and 7, the small black squares in FIG. 8 illustrate schematically the prediction methods.

In this embodiment of the invention, prediction method 70A is associated with macroblock segmentation 70, prediction method 71B is used with macroblock segmentation 71 and prediction method 72B is used with macroblock segmentation 72. The selection of these macroblock-segmentation—prediction method pairs is quite intuitive, When the current macroblock is segmented using macroblock segmentation 71, it is reasonable to expect that the left block C1 and the right block C2 of the macroblock move somehow differently. It is quite natural to assume that the left block C1 would move in a similar way to the prediction block L and to derive the prediction motion coefficients for block C1 from the motion coefficients of prediction block L of block C1. Similarly, it makes sense to use the motion coefficients of prediction block UR of block C2 in deriving the prediction motion coefficients for the right block C2. Similar reasoning applies to the prediction method associated with macroblock segmentation 72. When the current macroblock is not segmented into smaller blocks (macroblock segmentation 70), it is not clear which of the neighboring blocks would provide good prediction motion coefficients, and the prediction motion coefficients are calculated as an average using the three prediction blocks L, U and UR in prediction method 70A.

In the prediction method related to macroblock segmentation 83, the prediction motion coefficients for each block within the current macroblock are derived as average values using three prediction blocks. For block C4 within the current macroblock there is no available UR prediction block because that block is not yet processed. Therefore, the prediction motion coefficients for block C4 are derived using blocks C1, C2 and C3 within the current macroblock. The prediction motion coefficients for blocks C1, C3, C5 and C7 related to macroblock segmentation 84 are derived as averages of the prediction blocks, as specified in FIG. 8. For blocks C2, C4, C6 and C8 related to macroblock segmentation 84, prediction motion coefficients are derived from the motion coefficients of the block on the left hand side of each block, i.e. block C1, C3, C5 and C7 of the current macroblock, respectively. The prediction motion coefficients for the blocks relating to macroblock segmentation 85 are produced as averages, as specified in FIG. 8. Again, there is no UR prediction block available for block C8 in macroblock segmentation 85, and therefore blocks C3, C4 and C7 within the same macroblock are used in producing prediction motion coefficients for that block. A second sensible alternative for the prediction method related to macroblock segmentation 85 is, for example, median prediction for the blocks in the upper row of the macroblock 85 and subsequent use of the motion coefficients of these blocks to derive prediction motion coefficients for the blocks in the lower row.

The number of prediction blocks and the choice of blocks to be used as prediction blocks may further depend on the position of the current macroblock in the frame and on the scanning order of the blocks/macroblocks within the frame. For example, if the encoding process starts from the top left-hand corner of the frame, the block in the top left-hand corner of the frame has no available prediction blocks. Therefore the prediction motion coefficients for this block are usually zero. For the blocks in the upper frame boundary, prediction using a prediction block to the left (prediction block L) is usually applied. For the blocks in the left-hand frame boundary, there are no left (L) prediction blocks available. The motion coefficients of these blocks may be assumed to be zero, if an average prediction is used for the blocks at the left frame boundary. Similarly, for the blocks at the right-hand frame boundary the upper right (UR) prediction block is missing. The prediction motion coefficients for these blocks can be derived, for example, in a manner similar to that described in connection with block C4 of macroblock segmentation 83 in FIG. 8.

The details of prediction methods used in a method according to the invention are not restricted median prediction or single block predictions. They are presented in the foregoing description as examples. Furthermore, any of the already processed blocks can be used in constructing the prediction motion field/coefficients for a certain block. The macroblock-segmentation—prediction-method pairs discussed above are also presented as examples of feasible pairs. In a method according to the invention the macroblock segmentations, prediction methods and mapping between the macroblock segmentations and prediction methods may be different from those described above.

Figure 10:
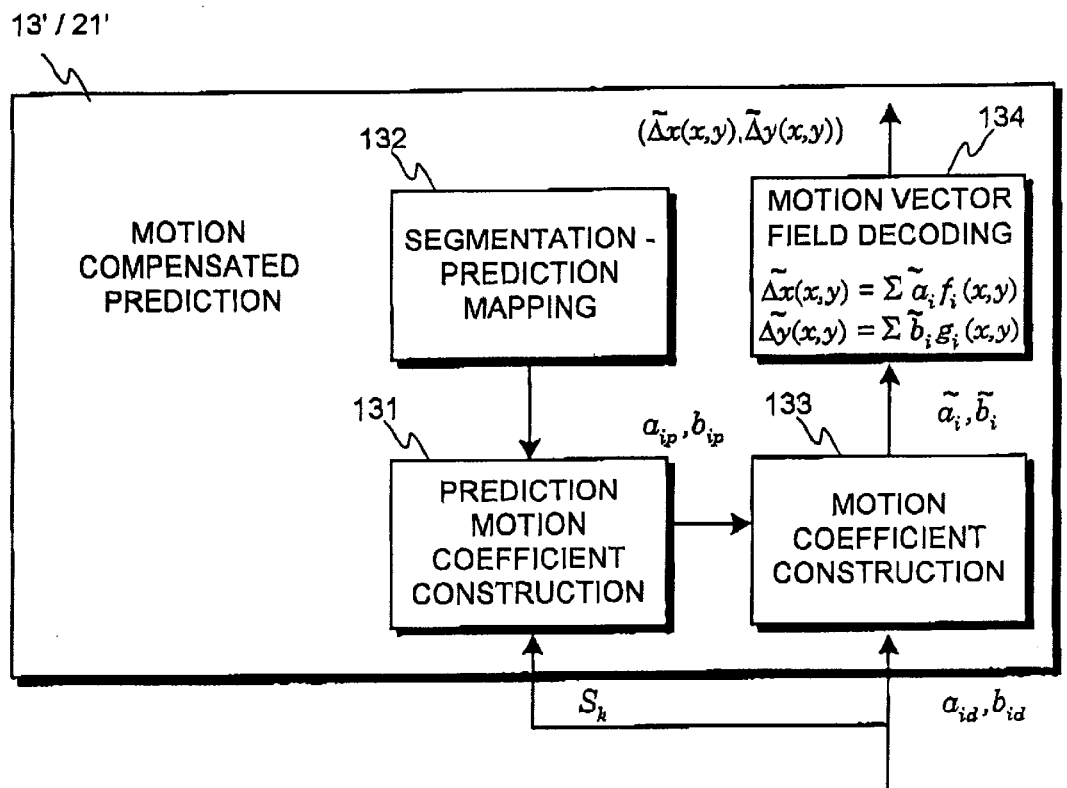
FIG. 10 illustrates a motion compensated prediction block according to the invention.
Figure 9:
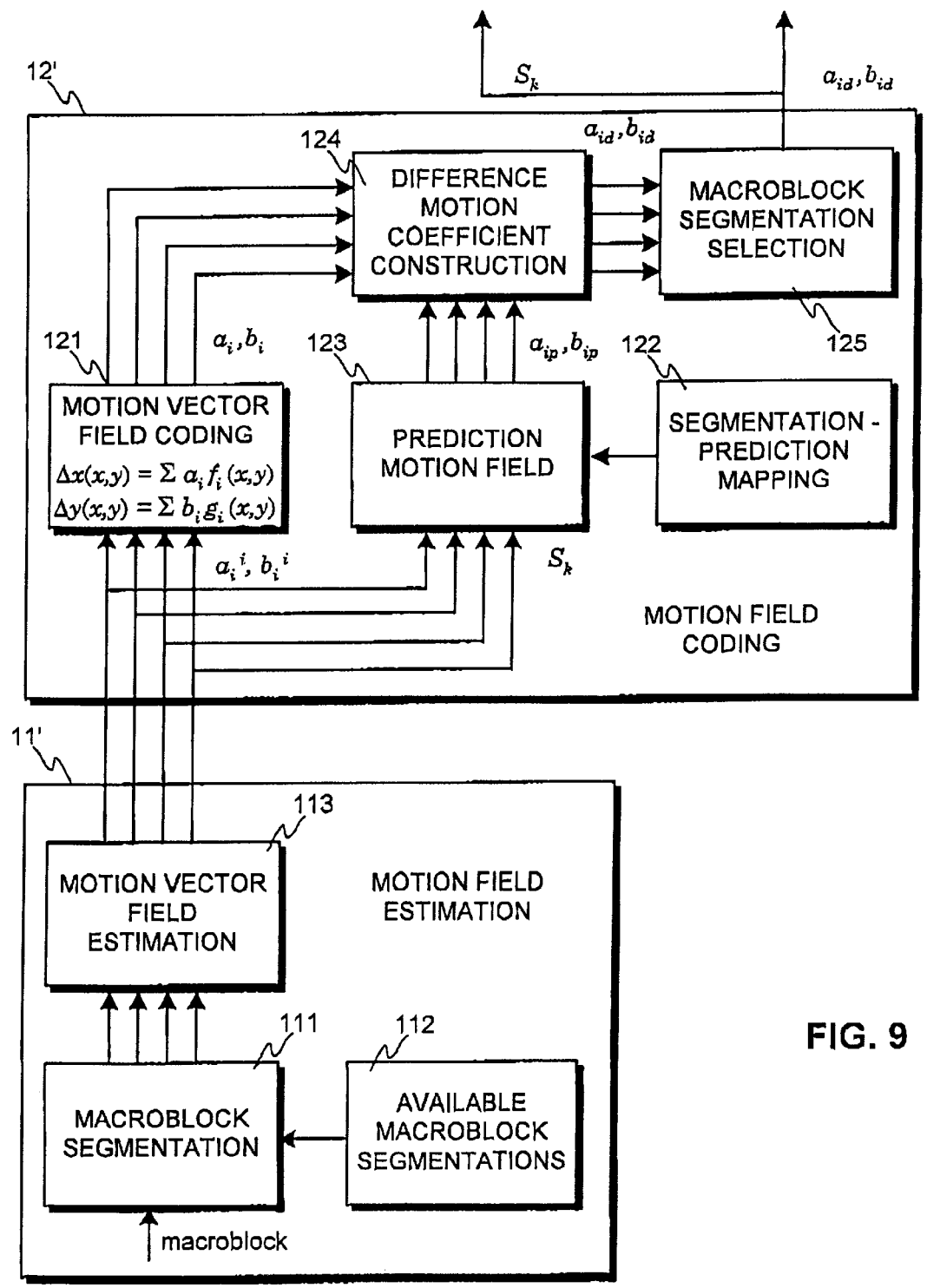
FIG. 9 illustrates a motion field estimation block and a motion field coding block according to the invention.

FIG. 9 illustrates an example of a Motion Field Estimation block 11' and a Motion Field Coding block 12' according to the invention. FIG. 10 illustrates an example of a Motion Compensated Prediction block 13'/21' according to the invention. An encoder according to the invention typically comprises all these blocks, and a decoder according to the invention typically comprises a Motion Compensated Prediction block 21'.

In the Motion Field Coding block 11' there is a Macroblock Segmentation block 111, which segments an incoming macroblock into blocks. The Available Macroblock Segmentations block 112 comprises information about the possible macroblock segmentations $S_k$. In FIG. 9 the number of possible macroblock segmentations is illustrated by presenting each segmentation as a arrow heading away from the Macroblock Segmentation block 111. The various macroblock segmentations are processed in a Motion Vector Field Estimation block 113, and the initial, motion coefficients $a_0^i, \ldots, a_n^i, b_0^i, \ldots, b_n^i$ corresponding to each macroblock segmentation are further transmitted to the Motion Compensated Prediction block 12'. There the Motion Vector Field Coding block 121 codes the estimated motion fields relating to each segmentation. The Segmentation—Prediction Method Mapping block 122 is responsible for indicating to the Prediction Motion Field block 123 the correct prediction method related to each macroblock segmentation. In the Difference Motion Coefficient Construction block 124 the motion fields of the blocks are presented as difference motion coefficients. The costs of the macroblock-segmentation—prediction-method pairs are calculated in the Macroblock Segmentation Selection block 125, and the most appropriate macroblock-segmentation—prediction-method pair is selected, The difference motion coefficients and some information indicating the selected segmentation are transmitted further. The information indicating the selected segmentation may also be implicit. For example, if there is only one macroblock segmentation producing four blocks and the format of the transmitted data reveals to the receiver that it is receiving four pairs of difference motion coefficients relating to a certain macroblock, it can determine the correct segmentation. If there are various available prediction methods per macroblock segmentation, there may be a need to transmit some information that also indicates the selected prediction method. Information about the prediction error frame is typically also transmitted to the decoder, to enable an accurate reconstruction of the image.

The Motion Compensated Prediction block 13'/21' receives information about difference motion coefficients and (implicit or explicit) information about the segmentation of a macroblock. It may also receive information about the selected prediction method if there is more than one prediction method available per macroblock segmentation. The segmentation information is used to produce correct prediction motion coefficients in the Prediction Motion Coefficient Construction block 131. The Segmentation—Prediction Method Mapping block 132 is used to store information about the allowed pairs of macroblock segmentations and prediction methods. The constructed prediction motion coefficients and received difference motion coefficients are used to construct the motion coefficients in the Motion Coefficient Construction block 133. The motion coefficients are transmitted further to a Motion Vector Field Decoding block 134.

An encoder or a decoder according to the invention can be realized using hardware or software, or using a suitable combination of both. An encoder or decoder implemented in software may be, for example, a separate program or a software building block that can be used by various programs. In the above description and in the drawings the functional blocks are represented as separate units, but the functionality of these blocks can be implemented, for example, in one software program unit, It is also possible to implement an encoder according to the invention and a decoder according to the invention in one functional unit. Such a unit is called a codec. A codec according to the invention may be a computer program or a computer program element, or it may implemented at least partly using hardware.

Figure 11:
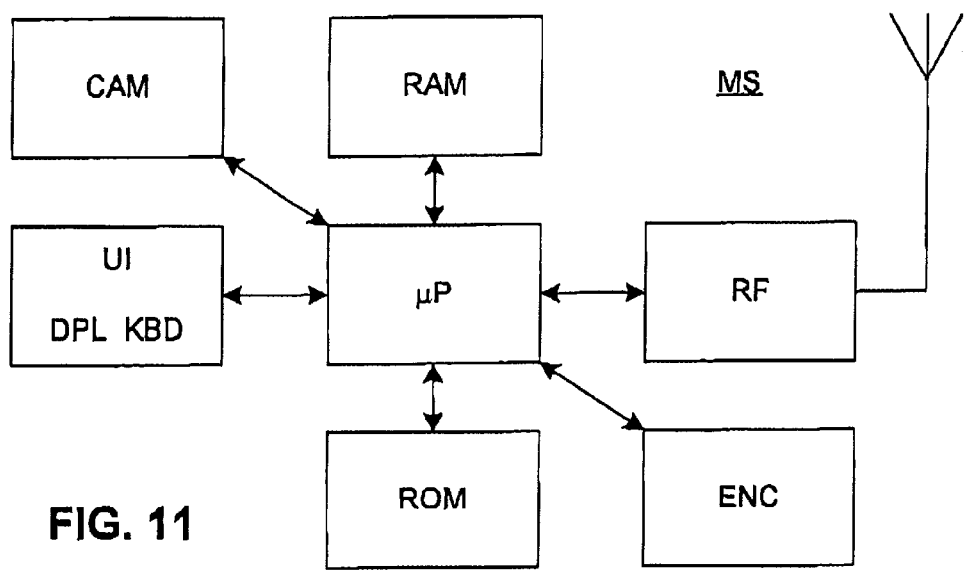
FIG. 11 illustrates a mobile station according to the invention.

FIG. 11 shows a mobile station MS according to an embodiment of the invention. A central processing unit, microprocessor $\mu$P controls the blocks responsible for different functions of the mobile station: a random access memory RAM, a radio frequency block RF, a read only memory ROM, a user interface UI having a display DPL and a keyboard KBD, and a digital camera block CAM. The microprocessor's operating instructions, that is program code and the mobile station's basic functions have been stored in the mobile station in advance, for example during the manufacturing process, in the ROM. In accordance with its program, the microprocessor uses the RF block for transmitting and receiving messages on a radio path. The microprocessor monitors the state of the user interface UI and controls the digital camera block CAM. In response to a user command, the microprocessor instructs the camera block CAM to record a digital image into the RAM, Once the image is captured or alternatively during the capturing process, the microprocessor segments the image into image segments and performs motion compensated encoding for the segments in order to generate a compressed image as explained in the foregoing description. A user may command the mobile station to display the image on its display or to send the compressed image using the RF block to another mobile station, a wired telephone or another telecommunications device. In a preferred embodiment, such transmission of image data is started as soon as the first segment is encoded so that the recipient can start a corresponding decoding process with a minimum delay. In an alternative embodiment, the mobile station comprises an encoder block ENC dedicated for encoding and possibly also for decoding of digital video data.

Figure 12:
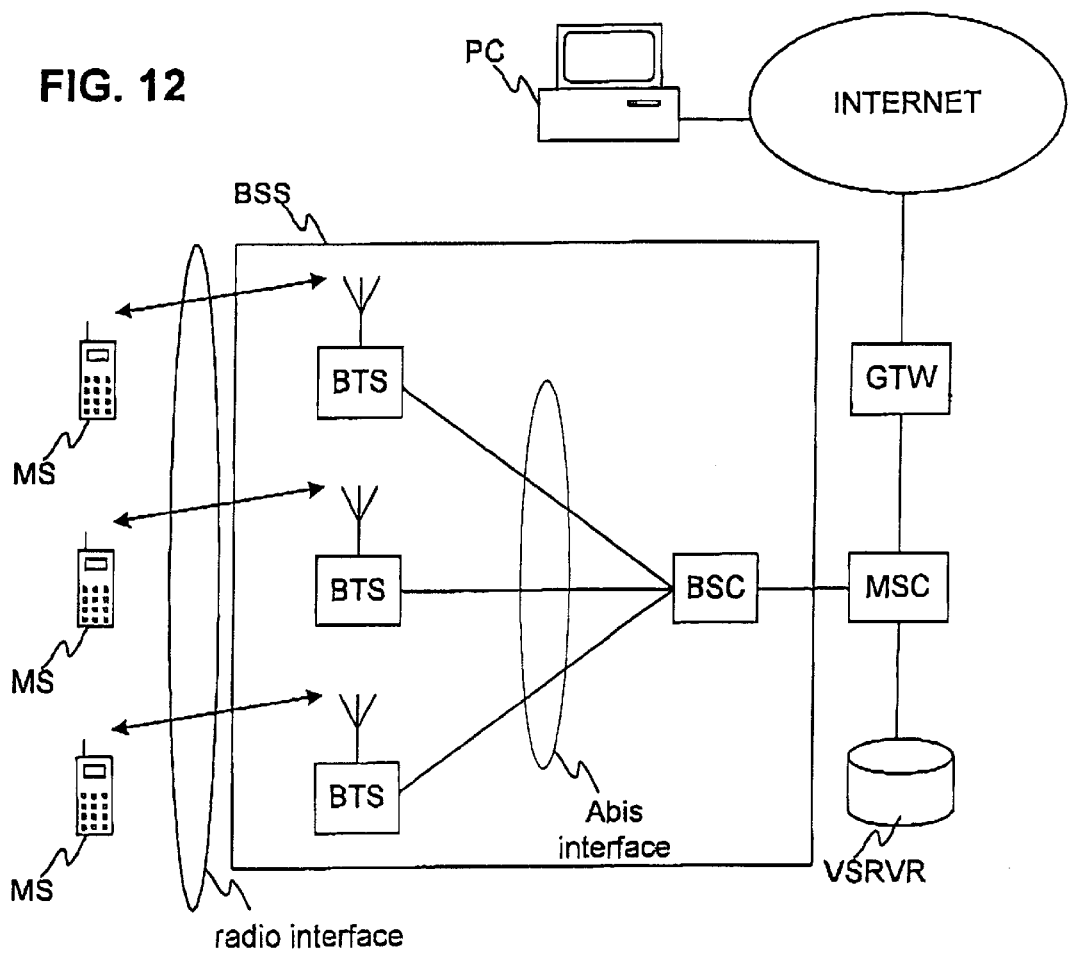
FIG. 12 illustrates schematically a mobile telecommunication network comprising a network element according to the invention.

FIG. 12 is a schematic diagram of a mobile telecommunications network according to an embodiment of the invention, Mobile stations MS are in communication with base stations BTS by means of a radio link. The base stations BTS are further connected, through a so-called Abis interface, to a base station controller BSC, which controls and manages several base stations. The entity formed by a number of base stations BTS (typically, by a few dozen base stations) and a single base station controller BSC, controlling the base stations, is called a base station subsystem BSS. Particularly, the base station controller BSC manages radio communication channels and handovers. On the other hand, the base station controller BSC is connected, through a so-called A interface, to a mobile services switching centre MSC, which co-ordinates the formation of connections to and from mobile stations. A further connection is made, through the mobile service switching centre MSC, to outside the mobile communications network. Outside the mobile communications network there may further reside other network(s) connected to the mobile communications network by gateway(s) GTW, for example the Internet or a Public Switched Telephone Network (PSTN). In such an external network, or in the telecommunications network, there may be located another video decoding or encoding stations, such as computers PC. In an embodiment of the invention, the mobile telecommunications network comprises a video server VSRVR to provide video data to a MS subscribing to such a service. This video data is compressed using the motion compensated video compression method as described earlier in this document. The video server may function as a gateway to an online video source or it may comprise previously recorded video clips. Typical videotelephony applications may involve, for example, two mobile stations or one mobile station MS and a videotelephone connected to the PSTN, a PC connected to the Internet or a H.261 compatible terminal connected either to the Internet or to the PSTN.

In view of the foregoing description it will be evident to a person skilled in the art that various modifications may be made within the scope of the invention. While a number of preferred embodiments of the invention have been described in detail, it should be apparent that many modifications and variations thereto are possible, all of which fall within the true spirit and scope of the invention.

I claim:

1. A method for encoding video information including deriving prediction motion coefficients for blocks within a macroblock of a video frame being encoded from motion coefficients of at least one prediction block that is a previously encoded macroblock or block within said video frame, the method comprising:

segmenting the video frame into macroblocks;
defining a certain number of available macroblock segmentations that specify possible ways in which a macroblock can be segmented into blocks;
defining for each available macroblock segmentation at least one available prediction method thereby providing a certain finite number of available macroblock-segmentation—prediction-method pairs, each prediction method defining a method for deriving prediction motion coefficients for blocks within a macroblock using motion coefficients of at least one prediction block;
selecting for a macroblock one of the available macroblock-segmentation—prediction-method pairs; and
segmenting the macroblock into blocks and deriving prediction motion coefficients for the blocks within said macroblock using the selected macroblock-segmentation—prediction-method pair.

2. A method for encoding video information according to claim 1, wherein at least one of the available macroblock-segmentation—prediction-method pairs defines the prediction motion coefficients for a block within said macroblock to be derived from the motion coefficients of only one prediction block.

3. A method for encoding video information according to claim 1, wherein at least one of the available macroblock-segmentation—prediction-method pairs defines that the prediction motion coefficients for a block within said macroblock are derived from the motion coefficients of at least a first prediction block and a second prediction block.

4. A method for encoding video information according to claim 3, wherein the prediction motion coefficients for a block are derived from a median of the motion coefficients of at least a first prediction block and a second prediction block.

5. A method for encoding video information according to claim 1, wherein at least one of the available macroblock-segmentation—prediction-method pairs specifies that the prediction motion coefficients for a block within said macroblock are derived from motion coefficients of prediction blocks within said macroblock.

6. A method for encoding video information according to claim 1, wherein a prediction block to be used in producing prediction motion coefficients for a block is defined as a block comprising a certain predetermined pixel, whose location is defined relative to said block.

7. A method for encoding video information according to claim 6, wherein the location of a predetermined pixel for a first block is different from the location of a predetermined pixel for a second block.

8. A method for encoding video information according to claim 1, wherein the number of prediction blocks per block is at most a certain number in any of the macroblock-segmentation—prediction-method pairs.

9. A method for encoding video information according to claim 8, wherein the number of prediction blocks per block is at most three.

10. A method for encoding video information according to claim 9, wherein a prediction block to be used in producing prediction motion coefficients for a block is defined as a block comprising a certain predetermined pixel, whose location is defined relative to said block.

11. A method for encoding video information according to claim 10, wherein at least for certain first blocks relating to certain first macroblock-segmentation—prediction-method pairs the predetermined pixels comprise the uppermost pixel adjacent to the block from the left, the leftmost pixel superjacent to the block and the pixel corner to corner with the upper right-hand pixel of the block.

12. A method for encoding video information according to claim 1, wherein the macroblocks and the blocks resulting from the macroblock segmentations are quadrilateral.

13. A method for encoding video information according to claim 12, wherein the blocks resulting from the macroblock segmentations are rectangular.

14. A method for encoding video information according to claim 12, wherein the available macroblock segmentations comprise a first macroblock segmentation resulting in one block, a second macroblock segmentation dividing a macroblock once with a vertical line, a third macroblock segmentation dividing a macroblock once with a horizontal line, a fourth macroblock segmentation dividing a macroblock once with a vertical line and once with a horizontal line, a fifth macroblock segmentation dividing a macroblock once with a vertical line and thrice with a horizontal line, and a sixth macroblock segmentation dividing a macroblock thrice with a vertical line and once with a horizontal line.

15. A method for encoding video information according to claim 12, wherein one prediction method is defined for each available macroblock segmentation, a prediction block for a block is defined as a block comprising a certain predetermined pixel, whose location is defined relative to said block, prediction coefficients for certain first blocks are derived from the motion coefficients of only one block-specific prediction block and prediction coefficients for certain second blocks are derived from the motion coefficients of more than one block-specific prediction blocks.

16. A method for encoding video information according to claim 1, wherein the macroblock segmentation of neighboring macroblocks affects the selection of a available macroblock-segmentation—prediction-method pair for a macroblock.

17. A method for encoding video information according to claim 1, wherein selection of the macroblock-segmentation—prediction-method pair is based on minimizing a cost function.

18. A method for encoding video information according to claim 1, wherein one macroblock-segmentation—prediction-method pair is defined for each available macroblock segmentation.

19. A method for encoding video information according to claim 18, further comprising transmitting information indicating the selected macroblock segmentation to a decoder or storing information indicating the selected macroblock-segmentation—prediction-method pair in a storage medium.

20. A method for encoding video information according to claim 1, further comprising transmitting information indicating the selected macroblock-segmentation—prediction-method pair to a decoder or storing information indicating the selected macroblock-segmentation—prediction-method pair in a storage medium.

21. A method for encoding video information according to claim 1, further comprising:
  estimating the motion of blocks within a macroblock with respect to a reference video frame;
  representing the motion of the blocks within the macroblock with a model comprising a set of basis functions and motion coefficients; and
  representing the motion coefficients thus obtained as a sum of the prediction motion coefficients and difference motion coefficients.

22. A method for encoding video information according to claim 21, wherein the model used to represent the motion of a block is a translational motion model.

23. A method for encoding video information according to claim 21, wherein the selection of the macroblock-segmentation—prediction-method pair is based on minimizing a cost function which includes at least a measure of a reconstruction error relating to a macroblock-segmentation—prediction-method pair and a measure of an amount of information required to indicate the macroblock-segmentation—prediction-method pair and to represent the difference motion coefficients of the blocks within said macroblock.

24. A method for encoding video information according to claim 21, further comprising:
  transmitting information indicating the selected macroblock-segmentation—prediction-method pair to a decoder or storing information indicating the selected macroblock-segmentation—prediction-method pair in a storage medium; and
  transmitting information about the difference motion coefficients to a decoder or storing information about the difference motion coefficients in a storage means.

25. A method for encoding video information according to claim 21, further comprising:
  reconstructing the motion of the blocks using the motion coefficients, basis functions and information about the macroblock segmentation;
  determining predicted video information using the reference video frame and the reconstructed motion of the blocks;
  determining corresponding prediction error video information based on a difference between the predicted video information and the video information of the macroblock;
  coding the prediction error video information and representing it with prediction error coefficients; and
  transmitting information about the prediction error coefficients to a decoder or storing information about the prediction error coefficients in a storage means.

26. A method for decoding encoded video information, including deriving prediction motion coefficients for blocks within a macroblock of a video frame being decoded from motion coefficients of at least one prediction block that is a previously decoded macroblock or block within said video frame, the method comprising:
  defining a certain number of available macroblock segmentations that specify possible ways in which a macroblock can be segmented into blocks;
  defining for each available macroblock segmentation at least one available prediction method, thereby providing a certain finite number of available macroblock-segmentation—prediction-method pairs, each prediction method defining a method for deriving prediction motion coefficients for blocks within a macroblock using motion coefficients of at least one prediction block;
  receiving information indicating at least the macroblock segmentation selected for a macroblock in said encoded video information; and
  determining the prediction method relating to the macroblock segmentation of said macroblock with reference to the defined macroblock-segmentation—prediction method pairs and producing prediction motion coefficients for blocks within said macroblock using the determined prediction method.

27. A method for decoding encoded video information according to claim 26, wherein at least two prediction methods relating to a certain available macroblock segmentation are defined.

28. A method for decoding encoded video information according to claim 26, wherein only one prediction method is defined for each available macroblock segmentation.

29. A method for decoding encoded video information according to claim 26, further comprising:
   receiving information about difference motion coefficients describing motion of blocks within a macroblock; and
   reconstructing motion coefficients for the blocks within said macroblock as a sum of the derived prediction motion coefficients and the difference motion coefficients.

30. A method for decoding encoded video information according to claim 29, further comprising;
   receiving information about prediction error coefficients describing prediction error video information, and
   determining a decoded piece of current video information using at least the motion coefficients and the prediction error video information.

31. A method for decoding encoded video information according to claim 26, wherein the step of receiving information indicating at least the macroblock segmentation selected for a macroblock in said encoded video information comprises receiving an indication of a selected macroblock-segmentation—prediction method pair.

32. An encoder for performing motion compensated encoding of video information, said encoder being arranged to derive prediction motion coefficients for blocks within a macroblock of a video frame being encoded from motion coefficients of at least one prediction block that is a previously encoded macroblock or block within said video frame, the encoder comprising:
   means for receiving a frame of video information;
   means for segmenting the frame of video information into macroblocks;
   means for specifying a certain number of available macroblock segmentations that define possible ways in which a macroblock can be segmented into blocks;
   means for specifying at least one available prediction method for each available macroblock segmentation, thereby providing a certain finite number of available macroblock-segmentation—prediction-method pairs, each prediction method defining a method for deriving prediction motion coefficients for blocks within a macroblock using motion coefficients of at least one prediction block;
   means for selecting one macroblock-segmentation—prediction method pair among the available macroblock-segmentation—prediction method pairs;
   means for segmenting a macroblock using the macroblock segmentation specified by the selected macroblock-segmentation—prediction-method pair; and
   means for deriving macroblock-segmentation-specific prediction motion coefficients for blocks within said macroblock using the prediction method specified by the selected macroblock-segmentation—prediction-method pair.

33. An encoder for performing motion compensated encoding of video information according to claim 32, further comprising:
   memory means for storing a reference video frame;
   means for estimating a motion field of blocks in the frame of video information using at least the reference video frame;
   means for producing motion coefficients describing the estimated motion fields; and
   means for producing difference motion coefficients using the motion coefficients and the prediction motion coefficients.

34. A storage device comprising an encoder according to claim 32.

35. A mobile station comprising an encoder according to claim 32.

36. A network element comprising an encoder according to claim 32.

37. A network element according to claim 36, wherein the network element is a network element of a mobile telecommunication network.

38. An encoder for performing motion compensated encoding of video information according to claim 32, wherein at least one of the available macroblock-segmentation—prediction-method pairs defines the prediction motion coefficients for a block within said macroblock to be derived from the motion coefficients of only one prediction block.

39. An encoder for performing motion compensated encoding of video information according to claim 32, wherein at least one of the available macroblock-segmentation—prediction-method pairs defines that the prediction motion coefficients for a block within said macroblock are derived from the motion coefficients of at least a first prediction block and a second prediction block.

40. An encoder for performing motion compensated encoding of video information according to claim 39, arranged to derive the prediction motion coefficients for a block from a median of the motion coefficients of at least a first prediction block and a second prediction block.

41. An encoder for performing motion compensated encoding of video information according to claim 32, wherein at least one of the available macroblock-segmentation—prediction-method pairs specifies that the prediction motion coefficients for a block within said macroblock are derived from motion coefficients of prediction blocks within said macroblock.

42. An encoder for performing motion compensated encoding of video information according to claim 32, arranged to derive prediction motion coefficients for a block using a prediction block that comprises a certain predetermined pixel, whose location is defined relative to said block.

43. An encoder for performing motion compensated encoding of video information according to claim 32, arranged to select a macroblock-segmentation—prediction-method responsive to minimizing a cost function.

44. An encoder for performing motion compensated encoding of video information according to claim 32, wherein one macroblock-segmentation—prediction-method pair is defined for each available macroblock segmentation.

45. An encoder for performing motion compensated encoding of video information according to claim 44, further arranged to transmit information indicating the selected macroblock segmentation to a corresponding decoder.

46. An encoder for performing motion compensated encoding of video information according to claim 32, further arranged to transmit information indicating the selected macroblock-segmentation—prediction-method pair to a corresponding decoder.

47. An encoder for performing motion compensated encoding of video information according to claim 32, further comprising:
   means for estimating the motion of blocks within a macroblock with respect to a reference video frame;

means for representing the motion of the blocks within the macroblock with a model comprising a set of basis functions and motion coefficients; and means for representing the motion coefficients thus obtained as a sum of the prediction motion coefficients and difference motion coefficients.

48. An encoder for performing motion compensated encoding of video information according to claim 47, arranged to select a macroblock-segmentation—prediction-method pair by minimizing a cost function that includes at least a measure of a reconstruction error relating to the macroblock-segmentation—prediction-method pair and a measure of an amount of information required to indicate the macroblock-segmentation—prediction-method pair and to represent the difference motion coefficients of the blocks within said macroblock.

49. An encoder for performing motion compensated encoding of video information according to claim 47, further comprising:

means for reconstructing the motion of the blocks using the motion coefficients, basis functions and information about the macroblock segmentation;

means for determining predicted video information using the reference video frame and the reconstructed motion of the blocks;

means for determining corresponding prediction error video information based on a difference between the predicted video information and the video information of the macroblock;

means for coding the prediction error video information and representing it with prediction error coefficients; and means for transmitting information about the prediction error coefficients to a corresponding decoder.

50. A decoder for performing motion compensated decoding of encoded video information, said decoder being arranged to derive prediction motion coefficients for blocks within a macroblock of a video frame being decoded from motion coefficients of at least one prediction block that is a previously decoded macroblock or block within said video frame, the decoder comprising:

means for defining a certain number of available macroblock segmentations that specify possible ways in which a macroblock can be segmented into blocks;

means for specifying at least one available prediction method for each available macroblock segmentation, thereby providing a certain finite number of available macroblock-segmentation—prediction-method pairs, each prediction method defining a method for deriving prediction motion coefficients for blocks within a macroblock using motion coefficients of at least one prediction block;

input means for receiving information indicating at least the macroblock segmentation selected for a macroblock;

means for determining the prediction method relating to the segmentation of the macroblock with reference to the defined macroblock-segmentation—prediction-method pairs; and means for producing prediction motion coefficients for blocks within said macroblock using the determined prediction method.

51. A decoder for performing decoding of encoded video information according to claim 50, further comprising:

input means for receiving information about difference motion coefficients of the blocks within said macroblock, and means for constructing motion coefficients using the prediction motion coefficients and the difference motion coefficients.

52. A mobile station comprising a decoder according to claim 50.

53. A decoder for performing motion compensated decoding of encoded video information according to claim 50, arranged to receive an indication of a selected macroblock-segmentation—prediction method pair.

54. Computer program element for performing motion compensated encoding of video information, said computer program element being arranged to derive prediction motion coefficients for blocks within a macroblock of a video frame being encoded from motion coefficients of at least one prediction block that is a previously encoded macroblock or block within said video frame, the computer program element comprising:

program means for receiving a frame of video information;

program means for segmenting the frame of video information into macroblocks;

program means for specifying a certain number of available macroblock segmentation, that define possible ways in which a macroblock can be segmented into blocks;

program means for specifying at least one available prediction method for each available macroblock segmentation, thereby providing a certain finite number of available macroblock-segmentation—prediction-method pairs, each prediction method defining a method for deriving prediction motion coefficients for blocks within a macroblock using motion coefficients of at least one prediction block;

program means for selecting one macroblock-segmentation—prediction method pair among the available macroblock-segmentation—prediction method pairs;

program means for segmenting a macroblock using the selected macroblock segmentations specified by the selected macroblock-segmentation—prediction-method pair; and program means for deriving macroblock-segmentation-specific prediction motion coefficients for blocks within said macroblock using the selected prediction method specified by the selected macroblock-segmentation—prediction-method pair.

55. Computer program element as specified in claim 54, embodied on a computer readable medium.

56. Computer program element for performing motion compensated decoding of encoded video information, said computer program element being arranged to derive prediction motion coefficients for blocks within a macroblock of a video frame being decoded from motion coefficients of at least one prediction block that is a previously decoded macroblock or block within said video frame, the computer program element comprising:

program means for defining a certain number of available macroblock segmentations that specify possible ways in which a macroblock can be segmented into blocks;

program means for specifying at least one available prediction method for each available macroblock segmentation, thereby providing a certain finite number of available macroblock-segmentation—prediction-method pairs, each prediction method defining a method for deriving prediction motion coefficients for blocks within a macroblock using motion coefficients of at least one prediction block;

program means for receiving information indicating at least the macroblock-segmentation selected for a macroblock;

program means for determining the prediction-method relating to the segmentation of the macroblock with reference to the defined macroblock-segmentation—prediction-method pairs; and program means for producing prediction motion coefficients for blocks within said macroblock using the determined prediction method.

57. Computer program element as specified in claim 56, embodied on a computer readable medium.

* * * * *

UNITED STATES PATENT AND TRADEMARK OFFICE
CERTIFICATE OF CORRECTION

PATENT NO.    : 6,711,211 B1
DATED         : March 23, 2004
INVENTOR(S)   : J. Lainema It is certified that error appears in the above-identified patent and that said Letters Patent is hereby corrected as shown below:

Column 24,
Line 22, "segmentation" should be -- segmentations --
Line 39, "segmentations" should be -- segmentation --

Signed and Sealed this

Twenty-first Day of September, 2004

JON W. DUDAS
*Director of the United States Patent and Trademark Office*